US005739087A

United States Patent [19]

Dennis

[11] Patent Number: 5,739,087
[45] Date of Patent: Apr. 14, 1998

[54] ORGANOCLAY PRODUCTS CONTAINING A BRANCHED CHAIN ALKYL QUATERNARY AMMONIUM ION

[75] Inventor: Harry Ryan Dennis, Gonzales, Tex.

[73] Assignee: Southern Clay Products, Inc., Gonzales, Tex.

[21] Appl. No.: 770,418

[22] Filed: Dec. 20, 1996

Related U.S. Application Data

[63] Continuation of Ser. No. 438,652, May 9, 1995, abandoned.

[51] Int. Cl.$^6$ .................... C10M 113/16; C09D 11/02
[52] U.S. Cl. ............................ 508/144; 508/136
[58] Field of Search ................. 508/136, 144; 106/31.13

[56] References Cited

U.S. PATENT DOCUMENTS

| | | | |
|---|---|---|---|
| 2,966,506 | 12/1960 | Jordan et al. | 260/448 |
| 3,252,757 | 5/1966 | Granquist | 23/111 |
| 3,586,478 | 6/1971 | Neumann | 23/111 |
| 3,666,407 | 5/1972 | Oriemann | 23/111 |
| 3,671,190 | 6/1972 | Neumann | 23/111 |
| 3,844,978 | 10/1974 | Hickson | 252/455 R |
| 3,844,979 | 10/1974 | Hickson | 252/455 R |
| 3,852,405 | 12/1974 | Granquist | 423/118 |
| 3,855,147 | 12/1974 | Granquist | 252/317 |
| 3,974,125 | 8/1976 | Oswald et al. | 525/531 |
| 4,081,496 | 3/1978 | Finlayson | 260/864 |
| 4,105,578 | 8/1978 | Finlayson et al. | 252/316 |
| 4,116,866 | 9/1978 | Finlayson | 252/316 |
| 4,208,218 | 6/1980 | Finlayson | 106/287.25 |
| 4,317,737 | 3/1982 | Oswald et al. | 252/28 |
| 4,382,868 | 5/1983 | House | 252/28 |
| 4,391,637 | 7/1983 | Mardis et al. | 106/20 |
| 4,410,364 | 10/1983 | Finlayson et al. | 106/20 |
| 4,412,018 | 10/1983 | Finlayson et al. | 523/508 |
| 4,434,075 | 2/1984 | Mardis et al. | 252/315.2 |
| 4,434,076 | 2/1984 | Mardis et al. | 252/315.2 |
| 4,450,095 | 5/1984 | Finlayson | 252/315.2 |
| 4,464,274 | 8/1984 | House | 252/28 |
| 4,517,112 | 5/1985 | Mardis et al. | 252/315.2 |
| 4,664,820 | 5/1987 | Magauran et al. | 252/28 |
| 4,695,402 | 9/1987 | Finlayson et al. | 252/315.2 |
| 5,075,033 | 12/1991 | Cody et al. | 252/28 |

*Primary Examiner*—Jerry D. Johnson
*Attorney, Agent, or Firm*—Klauber & Jackson

[57] ABSTRACT

Organoclay compositions which comprise the reaction product of a smectite-type clay having an ion exchange capacity of at least 50 meq. wt. per 100 g. clay (active basis), and a branched chain quaternary ammonium compound are useful self-activating and self-dispersing additives to liquid organic systems such as grease and ink formulations. Also included are grease and ink formulations using these organoclay compositions.

17 Claims, 2 Drawing Sheets

ORGANOCLAY PRODUCTS CONTAINING A BRANCHED CHAIN ALKYL QUATERNARY AMMONIUM ION

This Application is a Continuation of application Ser. No. 08/438,652, filed May 9, 1995, now abandoned.

BACKGROUND OF THE INVENTION

This invention relates generally to organoclays, and, more specifically, to improved organoclays which are produced by the reaction of the organoclay with an branched chain alkyl quaternary ammonium compound.

Organoclays, representing the reaction product of a smectite-type clay with a quaternary ammonium compound, have long been known for use in gelling of organic liquids such as lubricating oils, linseed oil, toluene and the like. A large variety of highly useful products, such as lubricating greases, are producible through use of such gelling agents. The procedures and chemical reactions pursuant to which these organoclays are prepared are well-known. Thus, under appropriate conditions, the organic compound which contains a cation, will react by ion exchange with the clay which contains a negative layer lattice and exchangeable cations to form the organoclay products.

The various organic compounds, typically quaternary ammonium salts, used to react with the clay, have been described in the art, for instance, in U.S. Pat. Nos. 2,966,506, 4,081,496, 4,105,578, 4,116,866, 4,208,218, 4,391,637, 4,410,364, 4,412,018, 4,434,075, 4,434,076, 4,450,095, and 4,517,112. U.S. Pat. No. 4,105,578 in particular describes an organophilic clay having enhanced dispersibility characteristics which is prepared using a methyl benzyl dialkyl quaternary ammonium salt wherein the dialkyl portions are alkyl groups containing a mixture of 14 to 20 carbon atoms and which preferably is methyl benzyl dehydrogenated tallow ammonium chloride.

OBJECTS OF THE INVENTION

It is an object of the present invention to prepare organoclay compositions having improved self-dispersing and self-activating capabilities, and which are thus useful for increasing the viscosity of liquid organic systems such as grease and ink compositions.

It is further an object of the present invention to prepare improved grease and ink compositions which possess improved properties by virtue of their inclusion of the organoclay compositions of the present invention.

SUMMARY OF THE INVENTION

In accordance with the present invention, it has unexpectedly been discovered that the reaction of smectite-type clays with certain branched chain alkyl quaternary ammonium compounds can produce an organoclay product having superior self-dispersing and self-activating capabilities when utilized in grease and ink formulations. Thus, the present invention relates to improved organoclay compositions containing a branched chain alkyl quaternary ammonium ion. More particularly, this invention relates to a smectite-type clay having an ion exchange capacity of at least 50 meq. wt. per 100 g. clay (active basis), and a branched chain alkyl quaternary ammonium compound having the following formula:

wherein $R_1$ and $R_2$ are both methyl groups, $R_3$ is a linear or branched saturated or unsaturated alkyl group having 12–22 carbon atoms, $R_4$ is hydrogen or a saturated lower alkyl group of 1–6 carbon atoms; $R_5$ is hydrogen or a linear or branched saturated alkyl group of 1–22 carbon atoms; $R_6$ is a linear or branched saturated alkyl group of 5–22 carbon atoms; with the proviso that the $—CR_4R_5R_6$ moiety contains at least one carbon branch; and X is the salt anion.

BRIEF DESCRIPTION OF THE DRAWING FIGURES

DETAILED DESCRIPTION OF THE INVENTION

Figure 1:
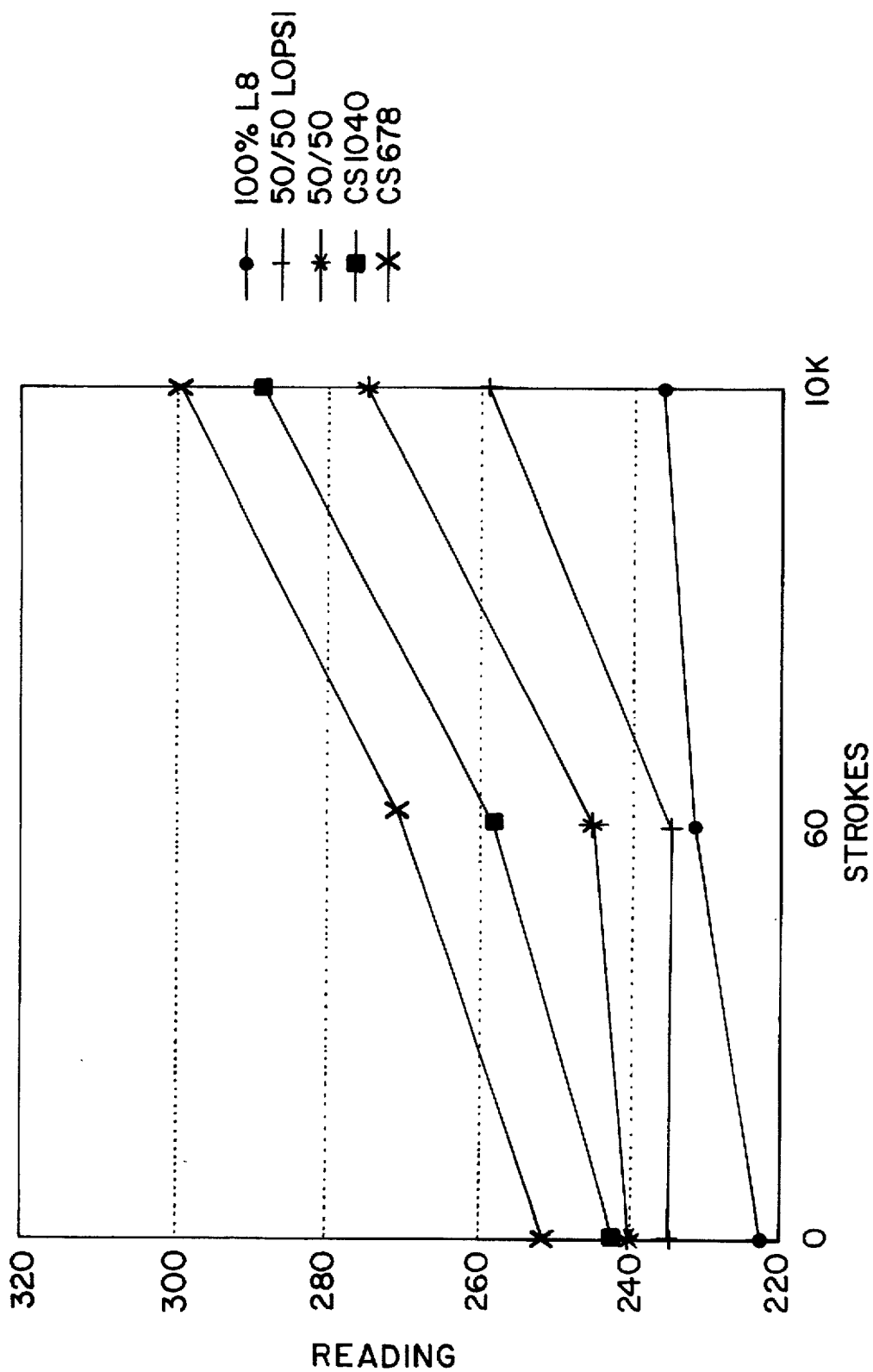
FIG. 1 is a graph showing the comparison in mechanical stability of an organoclay prepared with dimethyl-hydrogenated tallow-2-ethylhexyl methylsulfate quaternary ammonium salt (2HTL8) in a grease formulation with an existing commercial organoclay in the same grease formulation.

The smectite clays which are utilized as one of the starting materials of the present invention are those which have been conventionally utilized in the prior art. Suitable smectite-type clays are those which have a cation exchange capacity of at least 50 milliequivalents (meq.) weight (wt.) per 100 grams of clay (active basis). Useful clays for such purposes include both the naturally occurring Wyoming variety of swelling bentonite and similar clays, and hectorite, which is a swelling magnesium-lithium silicate clay, as well as, synthetically prepared smectite-type clays, such as montmorillonite, bentonite, beidelite, hectoritesaponite, and stevensite. Such clays, and processes for their preparation, are described in U.S. Pat. Nos. 4,695,402, 3,855,147, 3,852,405, 3,844,979, 3,844,978, 3,671,190, 3,666,407, 3,586,478, and 3,252,757, all of which are herein incorporated by reference. Preferred for use in the present invention is montimorillonite.

The clays are preferably converted to the sodium form if they are not already in this form. This can be effected, again as in known in the art, by a cation exchange reaction, or the clay can be converted via an aqueous reaction with a soluble sodium compound.

The branched chain alkyl quaternary ammonium salts utilized as reactants with the smectite-type clay are of the formula

wherein $R_1$ and $R_2$ are both methyl groups, $R_3$ is a linear or branched saturated or unsaturated alkyl group having 12–22 carbon atoms. $R_4$ is hydrogen or a saturated lower alkyl group of 1–6 carbon atoms; $R_5$ is hydrogen or a linear or branched saturated alkyl group of 1–22 carbon atoms; $R_6$ is a linear or branched saturated alkyl group of 5–22 carbon atoms; with the proviso that the —$CR_4R_5R_6$ moiety contains at least one carbon branch; and X is the salt anion.

Especially preferred compounds of formula (I) are the quaternary ammonium salts wherein $R_3$ is a hydrogenated tallow group and $R_4$, $R_5$ and $R_6$ are together a 2-ethylhexyl group.

The salt anion X is preferably methylsulfate, chloride or bromide or mixtures thereof, and is most preferably a methylsulfate ion. The salt anion may also, however, be nitrate, hydroxide, acetate, phosphate or mixtures of these.

The branched chain alkyl group present in the quaternary ammonium compounds of formula I of the present invention determine the particularly advantageous properties of the resultant organoclays of the present invention. Thus, the prior art organoclays which contain straight chain saturated alkyl groups in the quaternary ammonium compound provide modified organoclays which lack the self-dispersing and the self-activating properties characteristic of the modified organoclays of the present invention.

The amount of the branched chain alkyl quaternary ammonium compound of formula I reacted with the smectite-type clay for the purposes of this invention must be sufficient to impart to the organophilic clay the enhanced dispersion characteristics desired and depends upon the specific clay. Typically, the amount of cation ranges from about 0.1 to about 150%, preferably from about 100 to about 130% of the cation exchange capacity of the clay. Thus, for example, when bentonite is used, the amount of cation reacted with the clay will range from about 85 to about 160 milliequivalents, preferably from about 130 to about 150 milliequivalents per 100 grams of clay, 100% active basis.

The cation exchange capacity of the smectite-type clay can be determined by the well-known ammonium acetate method.

The organoclay composition of the present invention is thus prepared by admixing an aqueous dispersion of the smectite-type clay, warmed to a temperature in excess of 30° C., with an branched chain quaternary ammonium compound of formula I to exchange the metal counterions that are naturally present in the smectite-type clay. The reaction is typically conducted at a temperature within the range of from about 40° C. to about 100° C. for a period of time sufficient for the branched chain quaternary ammonium compound to react with the clay particles.

Preferably, the clay is dispersed in the water at a concentration from about 3% to about 15% by weight and the slurry is centrifuged to remove non-clay impurities. The slurry is then agitated and heated to the desired temperature, and the quaternary ammonium salt added in the desired milliequivalent ratio. The branched chain quaternary alkyl ammonium compounds are typically liquids, but they can be dispersed in water to facilitate the reaction. Agitation is continued to effect completion of the reaction.

The amount of the branched chain alkyl quaternary ammonium compound added to the smectite-type clay for the purposes of this invention must be sufficient to impart to the clay the enhanced characteristics desired. The milliequivalent ratio is defined as the number of milliequivalents of the branched chain quaternary ammonium compound, per 100 grams of clay, 100% active basis. The typical smectite-type clays of this invention have a milliequivalent ratio of from about 10 to about 150. The preferred milliequivalent ratio will vary depending on the characteristics of the particular branched chain quaternary ammonium compound utilized and the end use for the resultant product.

When the organoclay composition of the present invention is utilized for its self-activating and self-dispersing properties in grease and ink compositions to increase the viscosity of liquid organic systems, it is typically employed in an amount of about 0.5 to 15% by weight of the total composition.

The present invention thus contemplates the preparation of liquid organic systems such as grease and ink formulations having improved properties which comprise the addition of the improved organoclay composition which is the reaction product of a smectite-type clay having an ion exchange capacity of at least 50 meq. wt. per 100 g. clay and a branched chain alkyl quaternary ammonium compound of the general formula I. These grease and ink formulations thus require little or no additional polar organic dispersants typically required in such formulations. Typically, the grease or ink formulation will contain the improved organoclay composition is an amount of about 1 to about 10% by weight of the finished formulation. Preferred grease formulations contain the organoclay in an amount of about 6% by weight of the finished grease or formulation. Preferred ink formulations contain the organoclay in an amount of about 2% by weight of the ink formulation.

Grease or ink formulations containing the organoclay composition of the instant invention exhibit the superior characteristics of being self-activating and self-dispersing when compared with standard commercially available organoclay compositions using typically available quaternary ammonium salts. The greases and inks formulated using the organoclay compositions of the present invention exhibit these properties when used to replace wholly or partially the typical organoclays used in presently available commercial greases and inks.

The invention will now be illustrated by a series of Examples, which are intended to set forth typical and preferred procedures to be utilized in the practice of the invention.

EXAMPLES

Example 1

Organo montmorillonites were prepared with aqueous bentonite slurry which had been passed through a Manton Gaulin homogenizer one time at 4200 psi. The slurry (~3.5 solids), was diluted to 2% solids and passed through the lab delaval disk centrifuge. After centrifugation, the slurry was passed through the lab Manton Gaulin homogenizer at 4200 psi twice more, for a total of 3 passes. The slurry was then heated to 150° F. and reacted with dimethyl-hydrogenated tallow-2-ethylhexylammonium methylsulfate (Arquad HTL8, a commercially available quaternary ammonium salt), a blend of Arquad HTL8 with dimethyldihydrogenated tallow ammonium chloride (Arquad 2HT, a commercially available quaternary salt), or other commercial quats. The quat/clay ratio as varied for each quat or quat blend. The quats were added to the aqueous slurry and the clay/quat slurry was allowed to react 30 minutes. The reacted slurry was sheared again through the lab Manton Gaulin at 4200 psi. All of the organoclays were vacuum filtered, fluid bed dried at 80° C., and milled by the Fritsch Pulverisette through a 0.2 mm screen.

Example 2

Grease formulations: The organoclays of the instant invention were evaluated in greases made with either a paraffinic mineral oil (Faxxam 46) acquired from Exxon, or a bright stock 150 oil obtained from Jet Lube. These greases were prepared at a 6% clay loading. The clay was added to the oil and mixed on a drill press for 15 minutes at 480 rpm. One gram of water was added to the oil/clay mixture, and the mixing continued for 20 minutes. The oil/clay mixture was then milled through a Speco colloid mill at 0.003 of an inch gap setting. The grease product was allowed to cool overnight. Cone penetrations were measured after 0, 60 and 10K strokes on a grease worker according to the ANSI/ASTM D1403-69 procedure.

Arquad 2HT. In blends, the cone penetrations are improved, and a 7% gain in mechanical stability is observed. This demonstrates that the quat blend is not sensitive to oil type with respect to providing self activation. Although x-ray diffraction, 001 d-spacings for the Arquad HTL8 organoclay at higher mer levels are not as high compared to "bigger" quats (i.e. Arquad 2HT and Arquad MB2HT (methyl benzyl dihydrogenated tallow ammonium chloride)), self activation still occurs.

TABLE #1

| Product | MER | 0 Strokes | 60 Strokes | 10K | % Loss | Å | % H2O | % LOI |
|---|---|---|---|---|---|---|---|---|
| 25% HTL8 | 115 | >300 | >300 | >300 | — | 28.4 | 1.13 | 41.55 |
| 75% 2HT | 125 | >300 | >300 | >300 | — | 29.8 | 1.08 | 43.23 |
| | 135 | >300 | >300 | >300 | — | 32.3 | 1.07 | 45.14 |
| | 145 | >300 | >300 | >300 | — | 31.3 | 1.00 | 46.16 |
| 50% HTL8 | 115 | >300 | >300 | >300 | — | 21.3 | 1.19 | 40.62 |
| 50% 2HT | 125 | 245 | 259 | 268 | 3.5 | 23.8 | 1.08 | 42.27 |
| | 135 | 228 | 240 | 261 | 8.8 | 27.6 | .98 | 44.19 |
| | 145 | 247 | 253 | 305 | 20.6 | 30.4 | .93 | 45.81 |
| 75% HTL8 | 115 | >300 | >300 | >300 | — | 21.9 | 1.30 | 38.71 |
| 25% 2HT | 125 | >300 | >300 | >300 | — | 27.6 | 1.19 | 40.44 |
| | 135 | 230 | 231 | 230 | — | 28.0 | 1.04 | 42.19 |
| | 145 | 223 | 231 | 244 | 5.6 | 27.7 | 1.01 | 43.82 |
| 100% HTL8 | 115 | >300 | >300 | >300 | — | 22.7 | 1.11 | 37.62 |
| | 125 | >300 | >300 | >300 | — | 25.4 | 1.07 | 39.27 |
| | 135 | 229 | 230 | 231 | 2.60 | 26.9 | 1.04 | 40.96 |
| | 145 | 220 | 220 | 250 | 13.6 | 28.4 | .96 | 42.56 |
| Baragel® 3000 | — | 242 | 258 | 288 | 11.6 | 29.2 | — | — |
| Baragel® 3000 | — | 250 | 270 | 298 | 10.4 | 28.6 | — | — |

Baragel® organoclays are commercially available from Rheox (disclosed in U.S. Pat. No. 4,664,820)

$$\% \text{Loss} = \frac{(10,000 \text{ Stroke Value}) - (60 \text{ Stroke Value})}{60 \text{ Stroke Value}} \times 100$$

Figure 2:
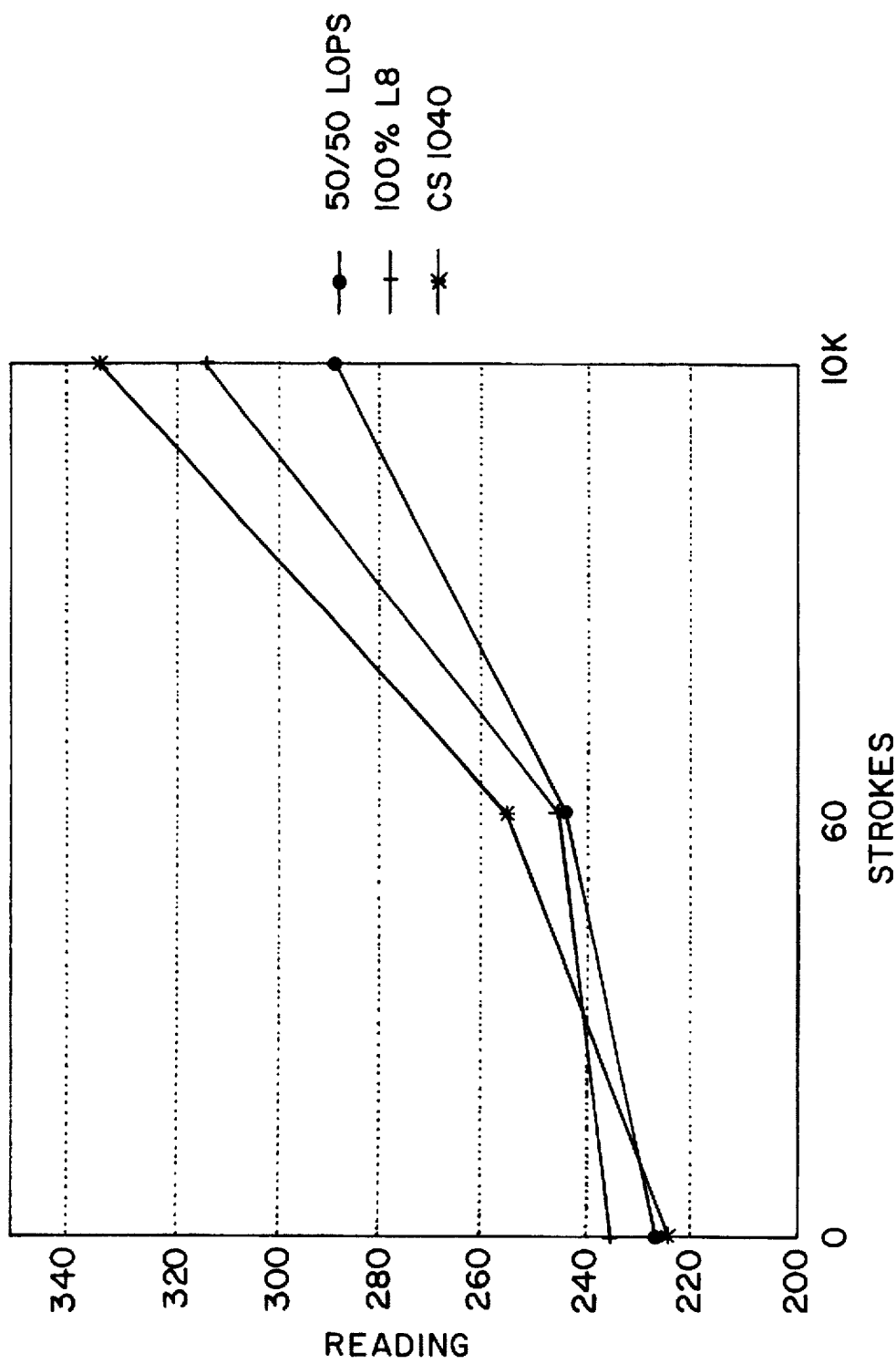
FIG. 2 is a graph showing the comparison in mechanical stability of an organoclay prepared with dimethyl-hydrogenated tallow-2-ethylhexyl methylsulfate quaternary ammonium salt (2HTL8) in a brightstock grease formulation with an existing commercial organoclay in the same grease formulation.

Test results:

Organoclays prepared with the dimethyl-hydrogenated tallow-2-ethylhexyl methylsulfate quaternary ammonium salt (Arquad HTL8), were found to provide better activator free performance with the addition of water as shown by the results given in Table 1 than organoclays prepared with quats typically found in commercial organoclays (Arquad HT) as shown by the results in Table 2. The organoclay prepared with dimethyl-hydrogenated tallow-2-ethylhexyl methosulfate quaternary ammonium salt (Arquad HTL8) shows significant improvement in mechanical stability verses existing commercial self activating and polar activated organoclays (11.6% loss in cone penetrations after 10K strokes, compared to 2.6%, as shown in the graph of FIG. 1. Cone penetration values rise, and mechanical stability decreases as the level of the dimethyl-hydrogenated tallow-2-ethylhexyl methylsulfate quaternary ammonium salt (Arquad HTL8) is replaced with the dimethyl dihydrogenated tallow ammonium chloride (Arquad HT). A smaller amount of dimethyl-hydrogenated tallow-2-ethylhexyl methosulfate quaternary ammonium salt (Arquad HTL8) in the quat blend somewhat lessens the self activating capabilities of the organoclay. This graph of FIG. 2 shows that Arquad HTL8 at 100% self activates in the bright stock 150 oil composition, as well as in blends of Arquad HTL8 with

TABLE #2

| | | CONE PENETRATIONS | | | | | |
|---|---|---|---|---|---|---|---|
| PRODUCT | MER | 0 Strokes | 60 Strokes | 10K Strokes | Å | % H₂O | % LOI |
| 2MHT | 115 | >300 | >300 | >300 | — | 1.81 | 44.30 |
| | *125 | >300 | >300 | >300 | 31.9 | 1.17 | 45.15 |
| | 135 | >300 | >300 | >300 | 34.1 | 1.18 | 47.32 |
| | 145 | >300 | >300 | >300 | 34.9 | 1.36 | 49.28 |
| 2MBHT | 115 | >300 | >300 | >300 | 19.5 | 1.98 | 36.63 |
| | 125 | >300 | >300 | >300 | 19.5 | 1.40 | 38.39 |
| | 135 | >300 | >300 | >300 | 18.7 | 1.28 | 40.12 |
| | 145 | >300 | >300 | >300 | 18.7 | 1.50 | 41.78 |
| 3MHT | 115 | >300 | >300 | >300 | 19.0 | 2.21 | 32.88 |
| | 125 | >300 | >300 | >300 | 19.0 | 2.12 | 34.27 |
| | 135 | >300 | >300 | >300 | 19.0 | 2.32 | 35.21 |
| | 145 | >300 | >300 | >300 | 19.0 | 2.09 | 37.30 |
| MB2HT | *115 | >300 | >300 | >300 | 30.3 | .81 | 45.63 |
| | 125 | >300 | >300 | >300 | 34.1 | .88 | 47.67 |
| | 135 | >300 | >300 | >300 | 34.8 | .83 | 49.56 |
| | 145 | >300 | >300 | >300 | — | 1.37 | 50.99 |

(3MHT denotes trimethyl hydrogenated tallow quat salt, commercially available)
*Showed some viscosity improvement Example 3

Inks: The montmorillonite modified as in Example 1 was utilized to prepare low viscosity newsprint inks, further establishing the self dispersing/self activating capability. Organoclays were prepared by the same procedure described earlier. The clays were milled through a 0.12 mm screen. The clays were evaluated at a 2% clay loading. The shear and time was varied to determine differences in dispersion among the organoclays tested. The ink/clay system was formulated in a ½ pint can. The samples were dispersed on a Dispermat Disperser with a 3 cm cowles blade. The resulting ink viscosity was then measured on a Brookfield small sample adapter, spindle #15 at 1, 10 and 100 rpm for 2 minutes, 30 seconds and 30 seconds respectively. Since the other organoclays tested fail to develop viscosity under low shear conditions.

Based upon the results of this study, the use of branched chain alkyl quaternary ammonium salts chemistry drastically improves the self dispersing/self activating capabilities or organo-montmorillonite, when compared to the other commercial quats. This self activation can be observed in both inks and greases and under a range of conditions.

TABLE 3

NEWSPRINT INK

| Product | Dispermat RPM | BROOKFIELD RPM | | | NPIRI | TEMP | TIME FOR GELLATION |
|---|---|---|---|---|---|---|---|
| | | 1 | 10 | 100 | | | |
| 100% HTL8 | 4K | 281,500 | 44,550 | — | 10-2 | 20.6 | — |
| 100% HTL8 | 3K | 275,500 | 45,350 | — | 10-2 | 20.9 | 7 MTS. |
| 100% HTL8 | 2K | 207,500 | 32,700 | — | 10-2 | 21.0 | — |
| 100% HTL8 | 1K | 36,000 | 9550 | 4205 | 10-0 | 21.3 | — |
| 50% HTL8 50% 2HT | 4K | 329,500 | — | — | 10-0 | 20.5 | 10 MTS |
| 50% HTL8 50% 2HT | 3K | 292,000 | — | — | 10-2 | 20.7 | — |
| 50% HTL8 50% 2HT | 2K | 15,500 | 6400 | 3430 | 10-0 | 21.0 | — |
| 50% HTL8 50% 2HT | 1K | 2,500 | 2550 | 2315 | 10-1 | 21.4 | — |
| Bentone 128 | 4K | 159,500 | 24,350 | — | 10-2 | 21.5 | 13 MTS |
| Bentone 128 | 3K | 142,000 | 21,550 | — | 10-1 | 21.5 | — |
| Bentone 128 | 2K | 28,000 | 6850 | 2775 | 10-4 | 21.6 | — |
| Bentone 128 | 1K | 16,000 | 5,050 | 2430 | 10-7 | 21.7 | Undispersed Lumps |
| Claytone HY | 4K | 131,500 | 21,100 | — | 10-0 | 21.2 | 16 MTS. |
| Claytone HY | 3K | 8,000 | 4,400 | 2430 | 10-0 | 21.3 | — |
| Claytone HY | 2K | 1,500 | 1800 | 2000 | 10-1 | 21.4 | — |
| Claytone HY | 1K | 1,500 | 1600 | 1800 | 10-2 | 21.4 | — |
| Control | — | 1,500 | 1500 | 1600 | 10-4 | 21.3 | — |

Bentone 128 is a commercially available organoclay from Rheox ®, disclosed in U.S. Pat. No. 4,105,578 made with MB2HT (methyl benzyl dihydrogenated tallow quat salt).
Claytone HY is a commercially available organoclay from SCP made with 2HT (dimethyl) dihydrogenated tallow quat salt).

inks are very thin initially, gellation could be visually observed by the disappearing of the vortex of the system. This time was recorded as gellation time.

TEST RESULTS:

The self activation mechanism of the Arquad HTL8 organoclay can also be observed in a newsprint ink. Table 3 shows viscosity development as a function of the shear and shear time used to disperse the organoclay in the ink for inks prepared using a branched chain alkyl ammonium salt organoclay as compared to inks prepared with organoclays containing other quaternary ammonium salts. Newsprint inks are very low in viscosity compared to heatset inks, some soya based inks and other high viscosity systems. This low viscosity system makes a self dispersing/self activating organoclay more desirable. When the ink/clay systems are sheared for 20 minutes at 400 rpm with a dispermat with a 3 cm cowles blade, gellation can be achieved with different clay/commercial quat chemistries. However when the shear time and shear rate are reduced, the viscosity of commercial quat/clays drastically diminishes, while Arquad HTL8 organoclays continue to provide good viscosity. The organoclays made from conventional quats can take up to 50% longer to activate when dispersion is reduced from 4000 to 2000 rpm. The Arquad HTL8 organoclays continue to gel where all

What is claimed is:

1. A self-activating and self-dispersing organoclay composition comprising the reaction product of a smectite-type clay having an ion exchange capacity of at least 50 meq. wt. per 100 g. clay (active basis), and a quaternary ammonium compound having the following formula:

wherein $R_1$ and $R_2$ are both methyl groups, $R_3$ is a linear or branched saturated or unsaturated alkyl group having 12-22 carbon atoms; the $CR_4R_5R_6$ moiety is a 2-ethylhexyl group, and X is the salt anion.

2. The composition of claim 1 wherein $R_3$ is a hydrogenated tallow group.

3. The composition of claim 1 wherein the quaternary ammonium salt is dimethyl hydrogenated tallow -2-ethyl hexyl ammonium methylsulfate.

4. The composition of claim 1 wherein the smectite-type clay is montmorillonite.

5. A method of increasing the viscosity of a liquid organic system comprising mixing with said liquid organic system an amount sufficient to effect said viscosity increase of the organoclay composition of claim 1.

6. The method of claim 5 wherein the quaternary ammonium salt is dimethylhydrogenated tallow-2-ethylhexylammonium methylsulfate.

7. The method of claim 5, wherein the smectite-type clay is montmorillonite.

8. A printing ink comprising an organic ink vehicle having dispersed therein an ink coloring material and a self-activating and self-dispersing organoclay composition comprising the reaction product of a smectitte-type clay having an ion exchange capacity of at least 50 meq. wt. per 100 g. clay (active basis), and a quaternary ammonium compound having the following formula:

(I)

wherein $R_1$ and $R_2$ are both methyl groups, $R_3$ is a linear or branched saturated or unsaturated alkyl group having 12–22 carbon atoms; the $CR_4R_5R_6$ moiety is a 2-ethylhexyl group, and X is the salt anion.

9. The ink of claim 8 wherein $R_3$ is a hydrogenated tallow group.

10. The ink of claim 8 wherein the quaternary ammonium salt is dimethylhydrogenated tallow-2-ethylhexylammonium methylsulfate.

11. The ink of claim 8 wherein the smectite-type clay is montmorillonite.

12. The ink of claim 8 wherein the organoclay composition is present in an amount of 1–3% by weight of the total composition.

13. A grease composition comprising an organic grease composition and a self-activating and self-dispensing organoclay composition comprising the reaction product of a smectite-type clay having an ion exchange capacity of at least 50 meq. wt. per 100 g. clay (active basis), and a quaternary ammonium compound having the following formula:

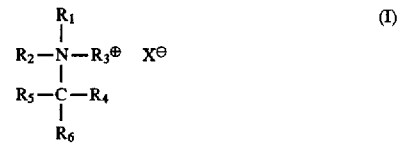
(I)

wherein $R_1$ and $R_2$ are both methyl groups, $R_3$ is a linear or branched saturated or unsaturated alkyl group of 1–22 carbon atoms; the $—CR_4R_5R_6$ moiety is a 2-ethylhexyl group and X is the salt anion.

14. The grease of claim 13 wherein $R_3$ is a hydrogenated tallow group.

15. The grease of claim 13 wherein the quaternary ammonium salt is dimethylhydrogenated tallow-2-ethylhexylammonium methylsulfate.

16. The grease of claim 13 wherein the smectite-type clay is montmorillonite.

17. The grease of claim 13 wherein the organoclay composition is present in an amount of about 6% by weight of the total composition.

* * * * *